United States Patent
Harada et al.

(10) Patent No.: US 10,869,285 B2
(45) Date of Patent: Dec. 15, 2020

(54) USER TERMINAL AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/327,394

(22) PCT Filed: Aug. 30, 2017

(86) PCT No.: PCT/JP2017/031150
§ 371 (c)(1),
(2) Date: Feb. 22, 2019

(87) PCT Pub. No.: WO2018/043559
PCT Pub. Date: Mar. 8, 2018

(65) Prior Publication Data
US 2019/0191401 A1 Jun. 20, 2019

(30) Foreign Application Priority Data
Aug. 31, 2016 (JP) ................................. 2016-170057

(51) Int. Cl.
*H04W 72/04* (2009.01)
*H04W 56/00* (2009.01)
*H04L 27/26* (2006.01)

(52) U.S. Cl.
CPC ......... *H04W 56/0005* (2013.01); *H04L 27/26* (2013.01); *H04W 56/00* (2013.01); *H04W 72/04* (2013.01); *H04W 72/0406* (2013.01)

(58) Field of Classification Search
CPC . H04W 56/0005; H04W 56/00; H04W 72/04; H04W 72/0406; H04L 27/26
See application file for complete search history.

(56) References Cited

U.S. PATENT DOCUMENTS

2009/0262710 A1* 10/2009 Doi ................. H04W 56/001
370/336
2010/0273494 A1* 10/2010 Iwai ................ H04L 27/2613
455/450
(Continued)

FOREIGN PATENT DOCUMENTS

WO 2009019879 A1 2/2009

OTHER PUBLICATIONS

3GPP TSG RAN WG1 Meeting #86, Gothenburg, Sweden Aug. 22-26, 2016 (R1-166682)—Note: Document also supplied by applicant (Year: 2016).*
(Continued)

Primary Examiner — Sithu Ko
Assistant Examiner — Malick A Sohrab
(74) Attorney, Agent, or Firm — Osha Bergman Watanabe & Burton LLP

(57) ABSTRACT

The present invention is designed so that synchronization signals and/or reference signals that are designed by taking into account the requirements for carriers can be used. According to one aspect of the present invention, a user terminal has a receiving section that receives at least one of a narrowband signal and a wideband signal, which are designed to share the same transmission timing, and a control section that exerts control, in which at least one of the narrowband signal and the wideband signal is used for synchronization and/or measurement, and the receiving section receives the narrowband signal in a partial frequency domain that is included in the frequency domain of the wideband signal, and receives the wideband signal in the frequency domain that includes the frequency domain of the narrowband signal.

11 Claims, 9 Drawing Sheets

(56) References Cited

U.S. PATENT DOCUMENTS

| | | | |
|---|---|---|---|
| 2012/0057566 A1* | 3/2012 | Ahmadi | H04L 12/5692 |
| | | | 370/331 |
| 2016/0087744 A1* | 3/2016 | El Ayach | H04J 11/0079 |
| | | | 370/328 |
| 2016/0227582 A1* | 8/2016 | Vajapeyam | H04W 4/70 |
| 2019/0182798 A1* | 6/2019 | Beale | H04W 64/006 |

OTHER PUBLICATIONS

Sierra Wireless; "Forward Compatibility of Broadcasted Signals and Channels for mMTC"; 3GPP TSG RAN WG1 Meeting #86 R1-166682; Gothenburg, Sweden, Aug. 22-26, 2016 (2 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

International Search Report issued for PCT/JP2017/031150, dated Nov. 14, 2017 (5 pages).

Written Opinion issued for PCT/JP2017/031150, dated Nov. 14, 2017 (3 pages).

Extended European Search report issued in the counterpart European Patent Application No. 17846563.9, dated Mar. 5, 2020 (11 pages).

* cited by examiner

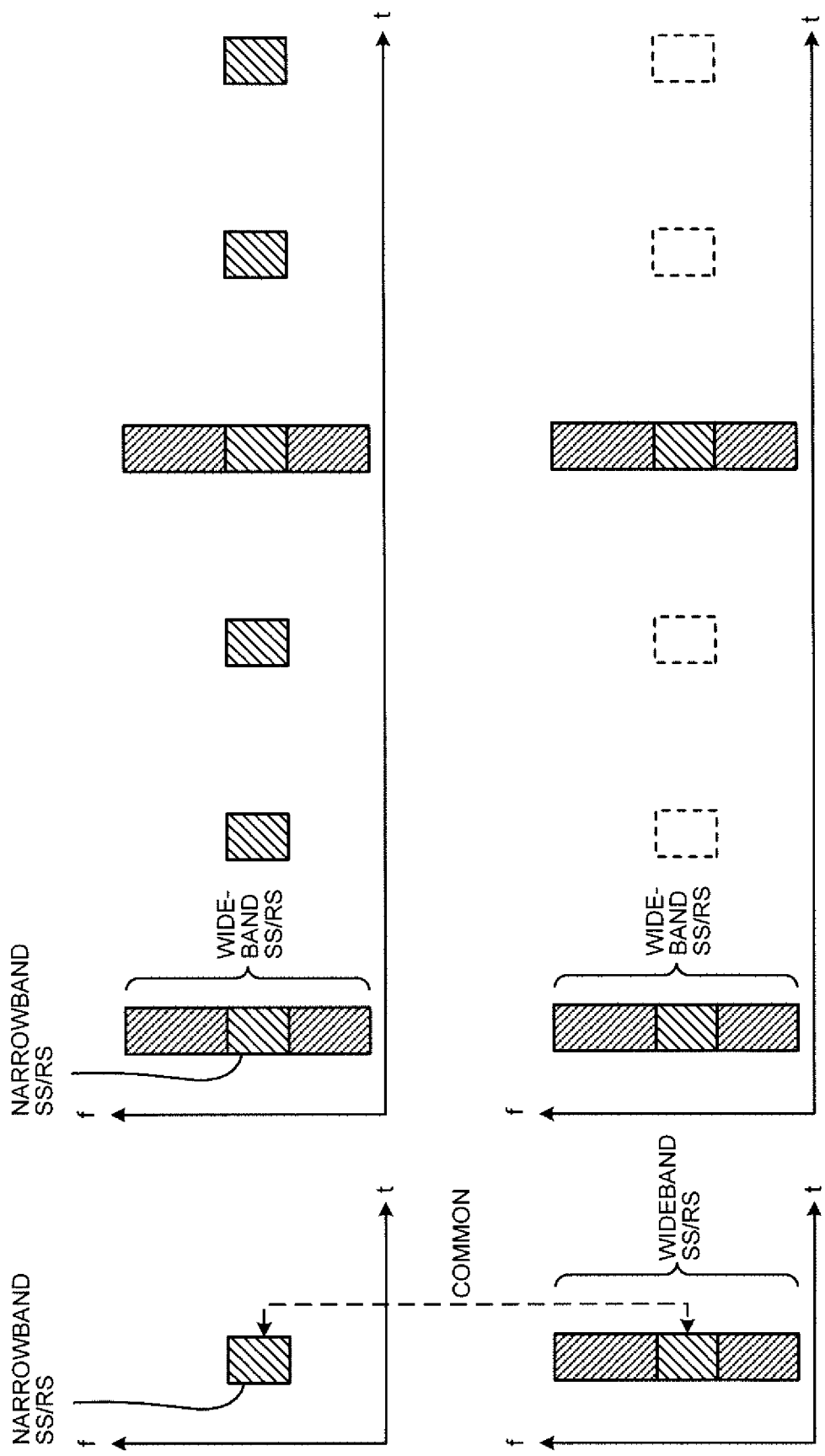

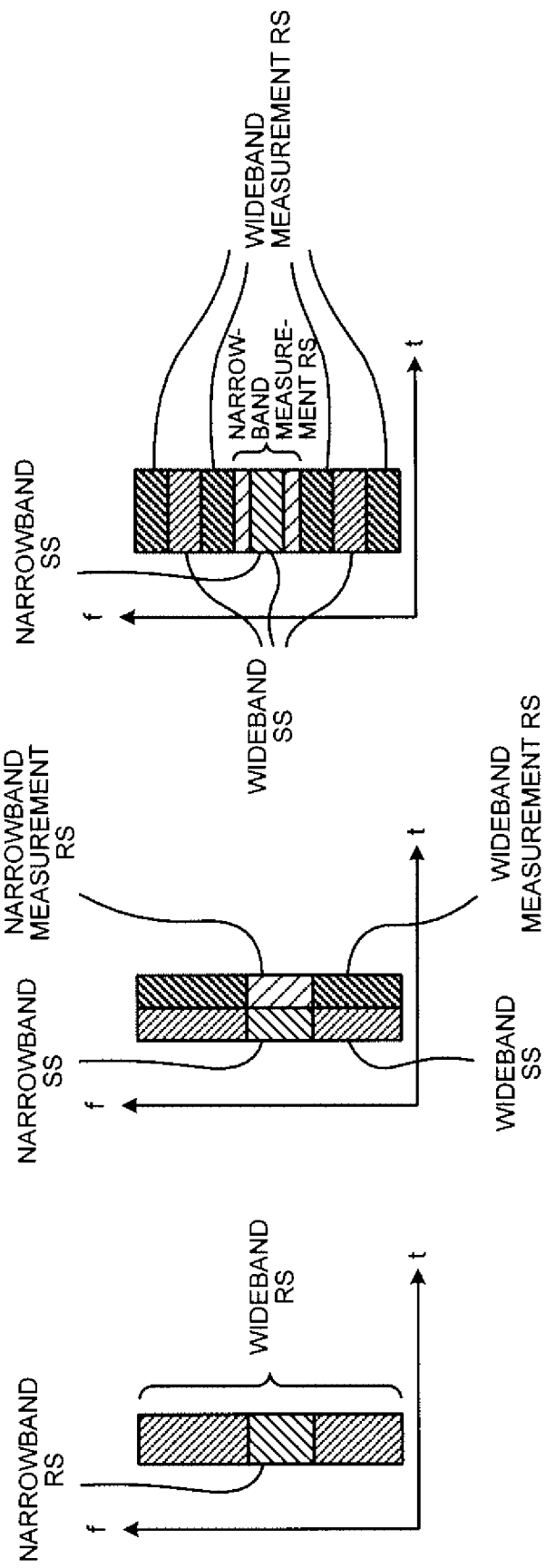

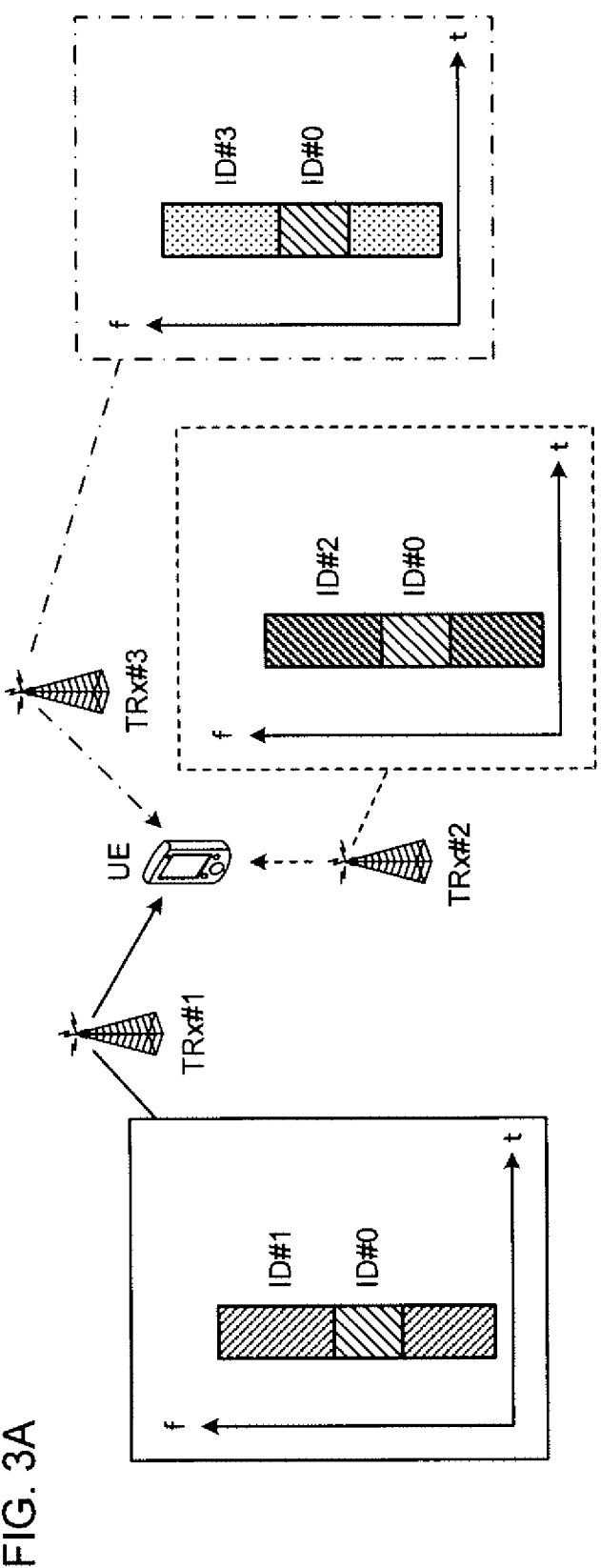
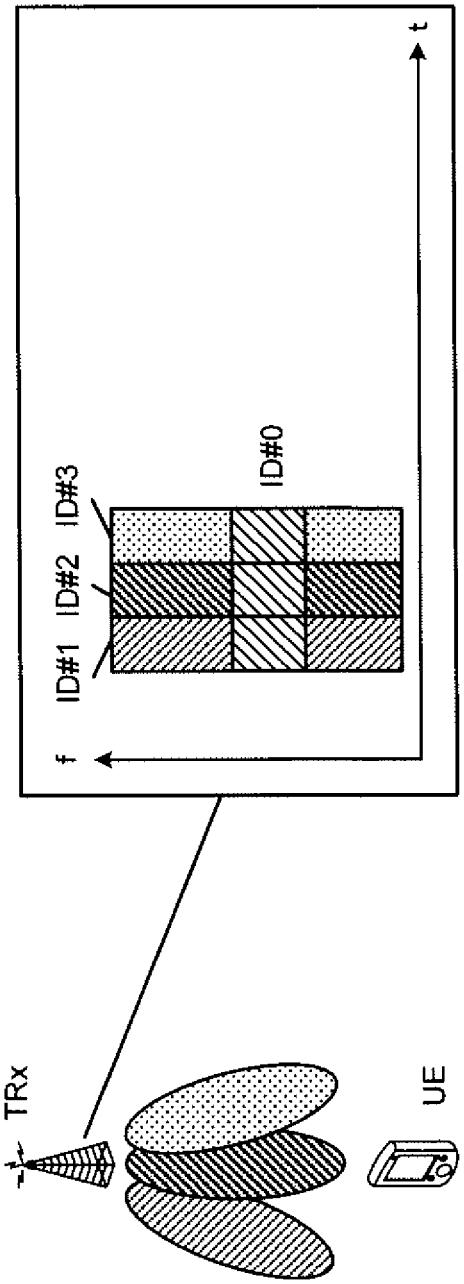
FIG. 3A
FIG. 3B

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for the purpose of achieving further broadbandization and increased speed beyond LTE (also referred to as "LTE Rel. 8" or "LTE Rel. 9"), and successor systems of LTE (also referred to as, for example, "FRA (Future Radio Access)," "5G (5th Generation mobile communication system)," "NR (New Radio)," "NX (New radio access)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CCs) is introduced in order to achieve broadbandization. Each CC is configured with the system bandwidth of LTE Rel. 8 as one unit. In addition, in CA, multiple CCs under the same radio base station (eNB (eNodeB)) are configured in a user terminal (UE (User Equipment)).

Meanwhile, in LTE Rel. 12, dual connectivity (DC), in which multiple cell groups (CGs) formed by different radio base stations are configured in UE, is also introduced. Each cell group is comprised of at least one cell (CC). Since multiple CCs of different radio base stations are integrated in DC, DC is also referred to as "inter-eNB CA."

Also, in LTE Rel. 8 to 12, frequency division duplex (FDD), in which downlink (DL) transmission and uplink (UL) transmission are made in different frequency bands, and time division duplex (TDD), in which downlink transmission and uplink transmission are switched over time and take place in the same frequency band, are introduced.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G, NR, etc.) are expected to realize various radio communication services by fulfilling varying requirements (for example, ultra-high speed, large capacity, ultra-low latency, etc.).

For example, 5G is under research to provide various radio communication services, referred to as, for example, "eMBB (enhanced Mobile Broad Band)," "IoT (Internet of Things)," "MTC (Machine-Type Communication)," "M2M (Machine-To-Machine)," "URLLC (Ultra Reliable and Low Latency Communications)," and so on. Note that M2M may be referred to as "D2D (Device-To-Device)," "V2V (Vehicle-To-Vehicle)" and so on, depending on what communication device is used.

To fulfill the requirements for various types of communication such as listed above, studies are underway to develop new communication access schemes (new RATs (Radio Access Technologies)). For example, 5G is under research to provide services through ultra-wideband communications (for example, 1 GHz) by using very high carrier frequencies (for example, 100 GHz).

5G anticipates use cases in various carriers. Consequently, different carriers may have different condition requirements (also referred to as "performance requirements")—for example, one carrier may place significance on establishing a connection in a short time, while another carrier may place significance on reducing overhead. However, since the synchronization signals, measurement reference signals and/or other signals in existing LTE are not designed in consideration of differences in requirements such as ones mentioned above, if the configurations of existing synchronization signals, reference signals and/or other signals are applied to 5G communication on an as-is basis, a drop in throughput, deterioration of communication quality and so on might surface as problems.

The present invention has been made in view of the above, and it is therefore an object of the present invention to provide a user terminal and a radio communication method, whereby synchronization signals and/or reference signals that are designed by taking into account the requirements for carriers can be used.

Solution to Problem

According to one aspect of the present invention, a user terminal has a receiving section that receives at least one of a narrowband signal and a wideband signal, which are designed to share the same transmission timing, and a control section that exerts control, in which at least one of the narrowband signal and the wideband signal is used for synchronization and/or measurement, and the receiving section receives the narrowband signal in a partial frequency domain that is included in the frequency domain of the wideband signal, and receives the wideband signal in the frequency domain that includes the frequency domain of the narrowband signal.

Advantageous Effects of Invention

According to the present invention, synchronization signals and/or reference signals that are designed by taking into account the requirements for carriers can be used.

BRIEF DESCRIPTION OF DRAWINGS

FIGS. 1A and 1B are diagrams to show examples of resources where narrowband SSs/RSs and wideband SSs/RSs are mapped according to an embodiment of the present invention;

FIGS. 2A, 2B and 2C are diagrams to show examples of structures of narrowband SSs/RSs and wideband SSs/RSs;

FIGS. 3A and 3B are diagrams to show examples, in which the ID of the narrowband SS/RS part in a wideband SS/RS and the ID of the rest of the parts are different;

DESCRIPTION OF EMBODIMENTS

Figure 4:
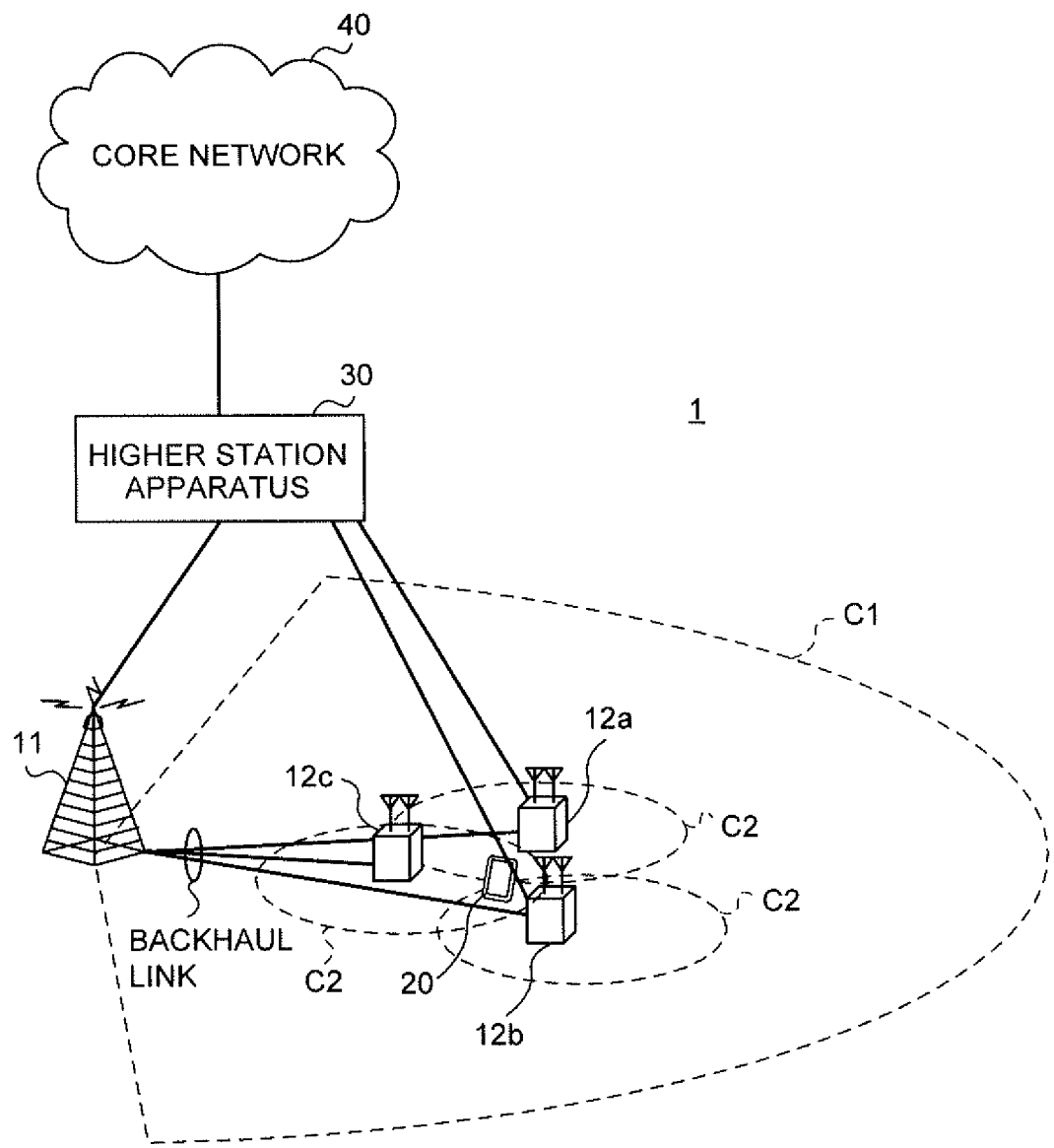
FIG. 4 is a diagram to show an exemplary schematic structure of a radio communication system according to an embodiment of the present invention.

Envisaging 5G/NR, studies are underway to support different types of carriers, including following (1) to (4):
 (1) stand-alone career;
 (2) non-stand-alone carrier;
 (3) licensed carrier; and
 (4) unlicensed carrier.

A stand-alone carrier refers to a frequency carrier (for example, a low frequency carrier for idling), with which UE, in the state of being unconnected with other carriers, can establish a connection. A non-stand-alone carrier refers to a frequency carrier, with which UE, in the state of being connected with another carrier, can establish a connection (for example, a high-frequency carrier that is additionally used to improve the speed of communication while the UE communicates in a given carrier). "Another carrier" in this context may be an NR carrier or an LTE carrier.

A licensed carrier is a frequency carrier that is assigned exclusively for one business. An unlicensed carrier is a frequency carrier that is shared by multiple businesses, RATs, and so forth.

LTE is designed to use common synchronization signals (primary synchronization signal (PSS) and secondary synchronization signal (SSS)) and common measurement reference signals (cell-specific reference signals (CRSs)), regardless of the type of carrier (regardless of the characteristics of carrier). Note that there can be exceptions where the network (for example, a base station) commands UE to use the PSS/SSS/CRS, which are transmitted in a long periodicity, for measurements, as discovery signals, or use channel state information reference signals (CSI-RSs) for measurements.

Now, when synchronization signals and measurement reference signals are used, the requirements for transmission in eNBs and detection in UEs are likely to vary depending on the type of carrier. First, when a stand-alone carrier is used, UE needs to gain initial access from the state in which the UE is not synchronized with the network, and therefore synchronization signals need to be transmitted in a short periodicity (for example, about 5 ms). Also in the idle state, too, it is necessary to monitor for synchronization signals and measurement reference signals, it is preferable to monitor these signals in narrow bands, from the perspective of reducing battery consumption.

In the event of a non-stand-alone carrier, UE is already connected with another carrier and synchronized to some extent with the network, so that the UE can learn what timing the non-stand-alone carrier transmits signals. Therefore, by making the transmission periodicity synchronization signals longer, the system overhead can be reduced. Also, in order to establish a connection with a non-stand-alone carrier in a short time and have better throughput-improving effect while communication is on-going with another carrier, it is preferable that the operations for detecting synchronization signals and measuring measurement reference signals are completed in a short time.

In a licensed carrier, signals can be transmitted at desired timing and synchronization signals and/or other signals can be transmitted periodically, so that it is possible to achieve desired accuracy of detection and measurements by using multiple samples.

In the event of an unlicensed carrier, it is necessary to execute LBT (Listen Before Talk) successfully before making transmission. LBT refers to the technique of "listening (sensing)" before transmitting a signal, and controlling transmission based on the result of listening. It then follows that an unlicensed carrier cannot guarantee periodic transmission, and when a design that uses multiple samples to achieve desirable level of accuracy is used, it is not possible to determine the time it takes to complete detection and measurements.

Now, as explained above, when using synchronization signals and measurement reference signals of common design in different types of carriers, it is difficult to meet all of the requirements. For example, when a signal is designed so that the signal can be detected in one shot (that is, by detecting and/or measuring one sample), the overhead in a stand-alone carrier and the load on UEs grow substantially.

So, the present inventors have come up with the idea of making different designs for synchronization signals and/or reference signals applicable depending on the type of carriers. According to one aspect of the present invention, it is possible to fulfill different requirements (such as that a connection must be established in a short time, that a connection must be established with little burden on UEs, that overhead must be reduced, and so forth), depending on the type of carrier.

Hereinafter, a synchronization signal will be abbreviated as an "SS," and a reference signal will be abbreviated as an "RS." Also, the phrase "SSs/RSs" as used herein will mean "one or more SSs and/or one or more RSs." Also, the reference signals will include reference signals for synchronization, reference signals for measurements, reference signals for demodulation, and so on.

Note that the SSs/RSs may be used to establish frequency and/or time synchronization, may be used for cell search (for example, to detect cell identities (IDs), transmission point IDs, and so forth), and may be used to measure received power (for example, RSRP (Reference Signal Received Power)), received quality (for example, RSRQ (Reference Signal Received Quality), SINR (Signal to Interference plus Noise Ratio), etc.), channel information (for example, CSI), and so forth.

Now, embodiments of the present invention will be described in detail below with reference to the accompanying drawings. The radio communication methods according to individual embodiments may be applied alone or may be applied in combination.

(Radio Communication Method)

Instead of using completely different SSs/RSs depending on the type of carrier, it is more preferable to design SSs/RSs so that SSs/RSs for different types of carriers share some common characteristics. By doing this, it is possible to suppress the increase of radio resources that are required for SSs/RSs.

<Structures of Narrowband SSs/RSs and Wideband SSs/RSs>

The herein-contained embodiments of the present invention define and use two groups of SSs/RSs. One group of SSs/RSs will be referred to as "narrowband SSs/RSs," and the other group of SSs/RSs will be referred to as "wideband SSs/RSs," but these names are by no means limiting. The narrowband SSs/RSs and the wideband SSs/RSs are preferably designed to share the same transmission timing (transmitted in the same time field). The wideband SSs/RSs are transmitted in a wider frequency band than the narrowband SSs/RSs. Note that both groups of SSs/RSs may be transmitted in consecutive frequency domains, or transmitted in discontinuous (separate) frequency domains.

It is assumed that the narrowband SSs/RSs and the wideband SSs/RSs are used in different types of carriers. For example, it may be possible to assume that the narrowband SSs/RSs are used primarily in stand-alone carriers and licensed carriers, while the wideband SSs/RSs are used in non-stand-alone carriers and unlicensed carriers. Each group of SSs/RSs will be described below with reference to FIG. 1.

FIG. 1 are diagrams to show examples of resources where narrowband SSs/RSs and wideband SSs/RSs are mapped, according to an embodiment of the present invention. As shown in FIG. 1A, narrowband SSs/RSs may constitute a subset of wideband SSs/RSs in the frequency domain. In other words, part of the signals that constitute the frequency domains of wideband SSs/RSs may be narrowband SSs/RSs. In this design, the narrowband SS/RS part can be used in common in the carrier where the wideband SSs/RSs are transmitted. UE can recognize the presence of the cell only by detecting the narrowband SS/RS part.

Also, referring to FIG. 1B, wideband SSs/RSs may constitute a subset of narrowband SSs/RSs in the time domain. For example, the transmission periodicity of wideband SSs/RSs is preferably an integer multiple of the transmission periodicity of narrowband SSs/RSs, and three times as large in the example of FIG. 1B. Also, in a carrier where wideband SSs/RSs are transmitted, the transmission periodicity for wideband SSs/RSs and the transmission periodicity for narrowband SSs/RSs may be the same, or narrowband SSs/RSs may be transmitted only at timings wideband SSs/RSs are transmitted.

If narrowband SSs/RSs are constituted by multiple signals (for example, PSS, SSS and RS), wideband SSs/RSs may be defined only for part of these signals. For example, an eNB may transmit a wideband signal and a narrowband signal for PSS, and transmit only a narrowband signal for SSS. On the other hand, if multiple signals constitute wideband SSs/RSs, narrowband SSs/RSs may constitute only part of these signals.

FIG. 2 are diagrams to show examples of structures of narrowband SSs/RSs and wideband SSs/RSs. FIG. 2A shows an example in which synchronization, ID detection and RSRP measurement are all performed using a single reference signal. In this case, it suffices to transmit only one RS in both the narrowband and the wideband.

FIGS. 2B and 2C show examples in which the functions of synchronization, ID detection and RSRP measurement are shared among a plurality of signals. In this case, multiple signals have to be transmitted in both the narrowband and the wideband. Referring to FIGS. 2B and 2C, for example, synchronization and ID detection are performed using SSs, and RSRP measurement is performed using measurement RSs. FIG. 2B shows an example in which multiple signals (SSs and measurement RSs) are time-division-multiplexed (TDM), and FIG. 2C shows an example in which multiple signals are frequency-division-multiplexed (FDM).

In FIG. 2B, SSs and measurement RSs are transmitted at different times, using the same frequency band. As shown in the drawing, wideband SSs may be transmitted so as to be adjacent to both sides (or one side) of the frequency domain for narrowband SSs. Also, wideband measurement RSs may be transmitted so as to be adjacent to both sides (or one side) of the frequency domain for narrowband measurement RSs. Preferably, the narrowband SSs and the narrowband measurement RSs are transmitted continuously in time. Also, the wideband SSs and the wideband measurement RSs are transmitted continuously in time. Note that the wideband SSs/RSs may be transmitted as signals that incorporate the frequency domain of narrowband SSs/RSs.

In FIG. 2C, SSs and measurement RSs are transmitted at the same time, using different frequencies. As shown in the drawing, the narrowband SSs may be transmitted so as to serve as a subset of wideband SSs in the frequency domain. The wideband SSs may be transmitted in a plurality of (three in FIG. 2C) frequency domains that are spaced apart. In addition, the narrowband measurement RSs may be signals that are adjacent to both sides (or one side) of the narrowband SSs and the frequency domain of these SSs. The wideband measurement RSs may be transmitted so as to be adjacent to both sides (or one side) of the frequency domain for the wideband SSs.

Note that the examples of SS/RS resource mapping shown in FIG. 2 are by no means limiting. For example, narrowband SSs may be time-division-multiplexed (TDM) with wideband SSs, or narrowband RSs may be time-division-multiplexed (TDM) with wideband RSs. Also, narrowband SSs may be frequency-division-multiplexed (FDM) with wideband RSs, or narrowband RSs may be frequency-division-multiplexed (FDM) with wideband SSs.

Also, multiple SSs/RSs may be code-division-multiplexed (CDM) and/or space-division-multiplexed (SDM) over the same time and frequency resource. A plurality of SSs/RSs may be multiplexed by combining at least two of TDM, FDM, CDM and SDM. Also, the number of SSs/RSs to be multiplexed may be three or more.

Both narrowband SSs/RSs and wideband SS/RS may have an arbitrary time duration, and be transmitted in, for example, one or more symbols, (OFDM (Orthogonal Frequency Division Multiplexing) symbols, SC-FDMA (Single Carrier Frequency Division Multiple Access) symbols, and so forth), or in symbols that span one or more subframes.

Narrowband SSs/RSs and wideband SSs/RSs (and other narrowband SSs/RSs, if there are any) may be transmitted side by side in time, transmitted apart in time, transmitted in the same periodicity, or transmitted in different periodicities. Wideband SSs/RSs and narrowband SSs/RSs (and other wideband SSs/RSs, if there are any) may be transmitted side by side in time, transmitted apart in time, transmitted in the same periodicity, or transmitted in different periodicities.

<Generation of Narrowband SSs/RSs and Wideband SSs/RSs>

When narrowband SSs/RSs constitute a subset of wideband SSs/RSs in the frequency domain, the narrowband SS/RS part and the rest of the parts in the wideband SSs/RSs may be generated based on different identity parameters (IDs). This can prevent stand-alone-connected UEs from detecting parts other than the narrowband SS/RS part.

That is, this can prevent the situation where UE detects only a portion of wideband SSs/RSs, mistakes this portion for narrowband SSs/RSs, and perform subsequent operations accordingly (including detection of broadcast information (the master information block (MIB), system information blocks (SIBs), and/or other operations).

When performing detection using wideband SSs/RSs, the ID of the narrowband SS/RS part, as well as other pieces of information, can be acquired from the combination of the ID of the narrowband SS/RS part and the ID of the rest of the parts. For example, the ID of the narrowband SS/RS part may be an ID that applies in common to a plurality of transmission points (also referred to as "transmitting/receiving points"). Note that an ID that is used in common in a plurality of transmission points (transmitting/receiving points) may be referred to as a "hyper-cell ID," for example.

Also, a part other than the narrowband SS/RS part included in wideband SSs/RSs may specify at least one of the transmission point (transmitting/receiving point) ID and the beam ID. Note that the combination of the ID of the narrowband SS/RS part and the ID of the rest of the parts may specify at least one of the transmission point (transmitting/receiving point) ID and the beam ID.

Such a design may be suitable for use when narrowband SSs/RSs (or the narrowband SS/RS part in wideband SSs/RSs) are for used for mobility measurements in the state in which no connection is established ("IDLE mode"), and wideband SSs/RSs (or parts other than the narrowband SS/RS part in wideband SSs/RSs) are used for mobility measurements in the state in which a connection is established ("CONNECTED mode").

FIG. 3 are diagrams to show examples, in which the ID of the narrowband SS/RS part in a wideband SS/RS and the ID of the rest of the parts are different. FIG. 3A shows an example in which multiple transmitting/receiving points (TRx #1 to #3) each transmit narrowband SSs/RSs and wideband SSs/RSs.

Each transmitting/receiving point generates the narrowband SS/RS part in the wideband SSs/RSs based on a common ID (ID #0). In addition, each transmitting/receiving point generates parts of the wideband SSs/RSs other than the narrowband SS/RS part based on transmitting/receiving point-specific IDs (ID #1 to #3). Each transmitting/receiving point transmits the wideband SSs/RSs generated thus.

When UE detects ID #0 from the narrowband SS/RS-equivalent part that is received, the UE can learn that the UE is located in the cell area (hyper-cell area) corresponding to ID #0. At this stage, the UE cannot determine which transmitting/receiving point is suitable for communicating with the UE.

The UE can detect at least one of IDs #1 to #3 based on parts of the received wideband SSs/RSs other than the narrowband SS/RS part, and perform measurements by specifying which transmitting/receiving point corresponding to the detected ID. The UE can choose an appropriate transmitting/receiving point based on the measurement results of the wideband SSs/RSs.

FIG. 3B shows an example in which a given transmitting/receiving point transmits narrowband SSs/RSs and wideband SSs/RSs using multiple beams. This transmitting/receiving point transmits a narrowband SS/RS part that is generated based on a common ID (ID #0), in all beams. In addition, this transmitting/receiving point transmits wideband SSs/RSs, which are generated based on beam-specific IDs (IDs #1, #2 and #3), on a per beam basis, apart from the narrowband SS/RS part.

When UE detects ID #0 from the narrowband SS/RS-equivalent part that is received, the UE can learn that the UE has received signals from the transmitting/receiving point corresponding to ID #0. At this stage, the UE cannot determine in which beam the signals have been transmitted.

The UE can detect at least one of IDs #1 to #3 based on parts of the received wideband SSs/RSs other than the narrowband SS/RS part, so that the UE can specify which beam corresponds to the detected ID, and report, for example, which beam is suitable, to the transmitting/receiving point.

Note that the sequence and/or the symbols of the wideband SSs/RSs may be generated differently than the sequence and/or the symbols of the narrowband SSs/RSs. In this case, different sequences and/or symbols can be generated even if the narrowband SSs/RSs and the wideband SSs/RSs are based on the same identity parameter.

According to the embodiment described above, it is possible to realize a flexible SS/RS design that can support various types of carriers.

(Variation)

UE may apply different performance requirements (including, for example, at least one of the side condition of SINR, the time it takes for detection (measurements), the accuracy, the number of signals to detect (measure) and so on) to the case of performing detection and measurements using only the narrowband SS/RS part, and the case of performing detecting and measurements using the wideband SS/RS part. For example, regarding wideband SSs/RSs, the UE may be able to detect and measure more cells (beams) in a shorter time at a given SINR.

Information as to whether wideband SSs/RSs are present or not (available or not), information about the transmission bandwidth for wideband SSs/RSs, and/or other pieces of information may be reported from the network to the UE. The method of transmitting wideband SSs/RSs can be changed depending on what operation policies (for example, the time for detection/measurements, overhead, UE power consumption, and so forth) each carrier (for example, a non-stand-alone carrier) has.

These pieces of information may be reported to (configured in) the UE by using higher layer signaling (for example, radio resource control (RRC) signaling), broadcast information (for example, the master information block (MIB), system information blocks (SIBs) and so forth), medium access control (MAC) signaling, physical layer signaling (for example, downlink control information (DCI)) and/or other signals, or by combining these.

For example, if the above-noted pieces of information are reported in SIBs, the UE can use wideband SSs/RSs even after initial access is gained (during idle mode, for example). In the event RRC-based reporting is used, while the UE is connected with at least one carrier, the UE can use wideband SSs/RSs to measure this carrier and/or other carriers.

Note that the transmission (measurement) bandwidth for wideband SSs/RSs may be reported by using a parameter apart from the system bandwidth. Measurements and reporting based on wideband SSs/RSs and measurements and reporting based on narrowband SSs/RSs may be configured individually. For example, reports based on wideband SSs/RSs and reports based on narrowband SSs/RSs may be configured to be transmitted in different periodicities.

Information about the timing for wideband SS/RS transmission (for example, the periodicity, the offset, and so on) may be reported from the network to the UE via above-mentioned higher layer signaling and/or others. Based on this information, the UE can assume that a predetermined periodicity and/or offset are applied to wideband SSs/RSs that are transmitted.

In addition, the UE can assume that wideband SSs/RSs are transmitted during a predetermined period after the UE transmits a predetermined UL signal, until a predetermined period of time passes (for example, during a period corresponding to the transmission periodicity of narrowband SSs/RSs). This UL signal may be referred to as a "wideband SS/RS request signal," "trigger signal," and so on. Note that the timing this trigger signal can be transmitted may be associated with the timing of narrowband SSs/RSs.

Note that, although two types of SSs/RSs—namely, narrowband SSs/RSs and wideband SSs/RSs—have been defined and used in the above-described embodiment, three or more types of SSs/RSs may be defined and used. For example, in addition to the narrowband SSs/RSs and the wideband SSs/RSs, ultra-wideband SSs/RSs, which are transmitted in a wider band than the wideband SSs/RSs, may be used. The contents described above regarding the wideband SSs/RSs can be re-interpreted presuming ultra-wideband SSs/RSs.

(Radio Communication System)

Now, the structure of the radio communication system according to an embodiment of the present invention will be described below. In this radio communication system, communication is performed using one or a combination of the radio communication methods according to the herein-contained embodiments of the present invention.

FIG. 4 is a diagram to show an exemplary schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G, "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement of cells and user terminals 20 is not limited to that shown in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base stations 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to this combination, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," and so forth) in response to the PUSCH is communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 5:
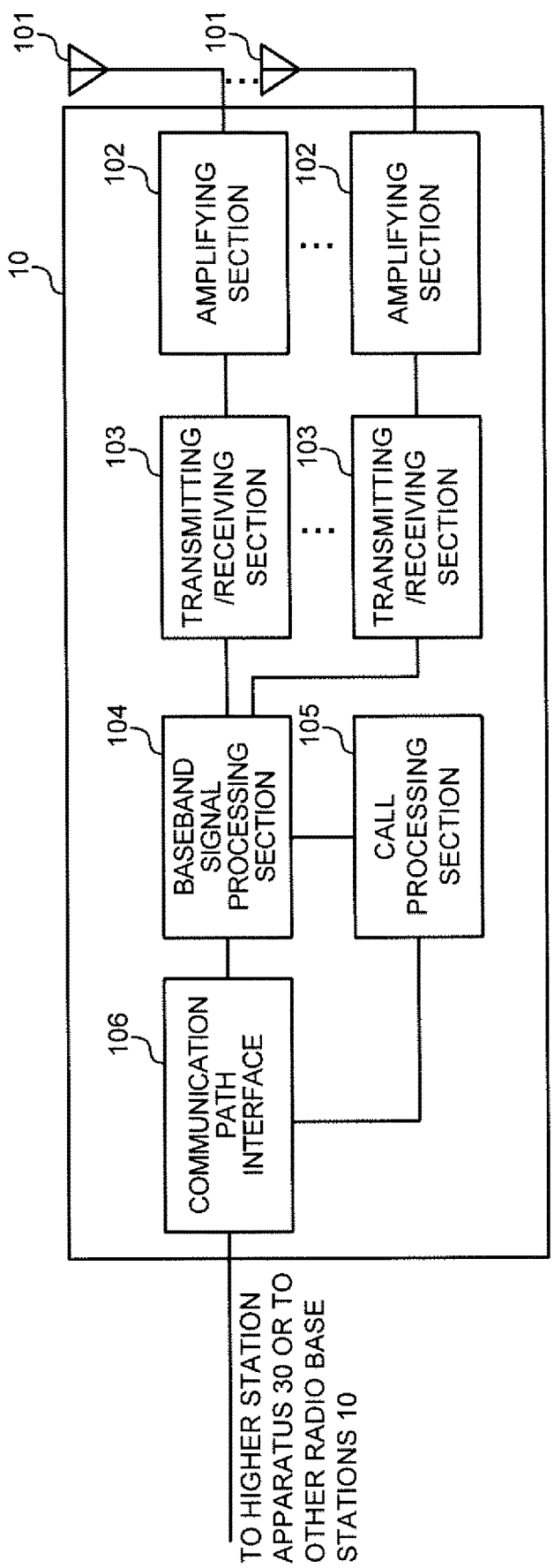
FIG. 5 is a diagram to show an exemplary overall structure of a radio base station according to an embodiment of the present invention.

FIG. 5 is a diagram to show an exemplary overall structure of a radio base station according to an embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRE (Common Public Radio Interface), the X2 interface, etc.).

Note that the transmitting/receiving sections 103 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 transmit at least one of narrowband signals (narrowband SSs/RSs) and wideband signals (wideband SSs/RSs), which are designed to share the same transmission timing.

The transmitting/receiving sections 103 may transmit the narrowband signals in a partial frequency domain that is included in the wideband signals' frequency domain, or the transmitting/receiving sections 103 may transmit the wideband signals in the frequency domain where the narrowband signals' frequency domain is included. Also, the narrowband signals and/or the wideband signals may be formed with a plurality of signals that are time-division-multiplexed (TDM) and/or frequency-division-multiplexed (FDM).

The transmitting/receiving sections 103 may transmit the wideband signals in a periodicity that matches an integer multiple of the transmission periodicity of the narrowband signals. The transmitting/receiving sections 103 may transmit at least one of information as to whether wideband signals are present or not, information about the transmission bandwidth for wideband signals, and information about the timing for transmission of wideband signals.

Also, the transmitting/receiving sections 103 may receive a request signal that requests wideband signals. In this case, the transmitting/receiving sections 103 may transmit wideband signals in a predetermined period following the transmission of the request signal.

Figure 6:
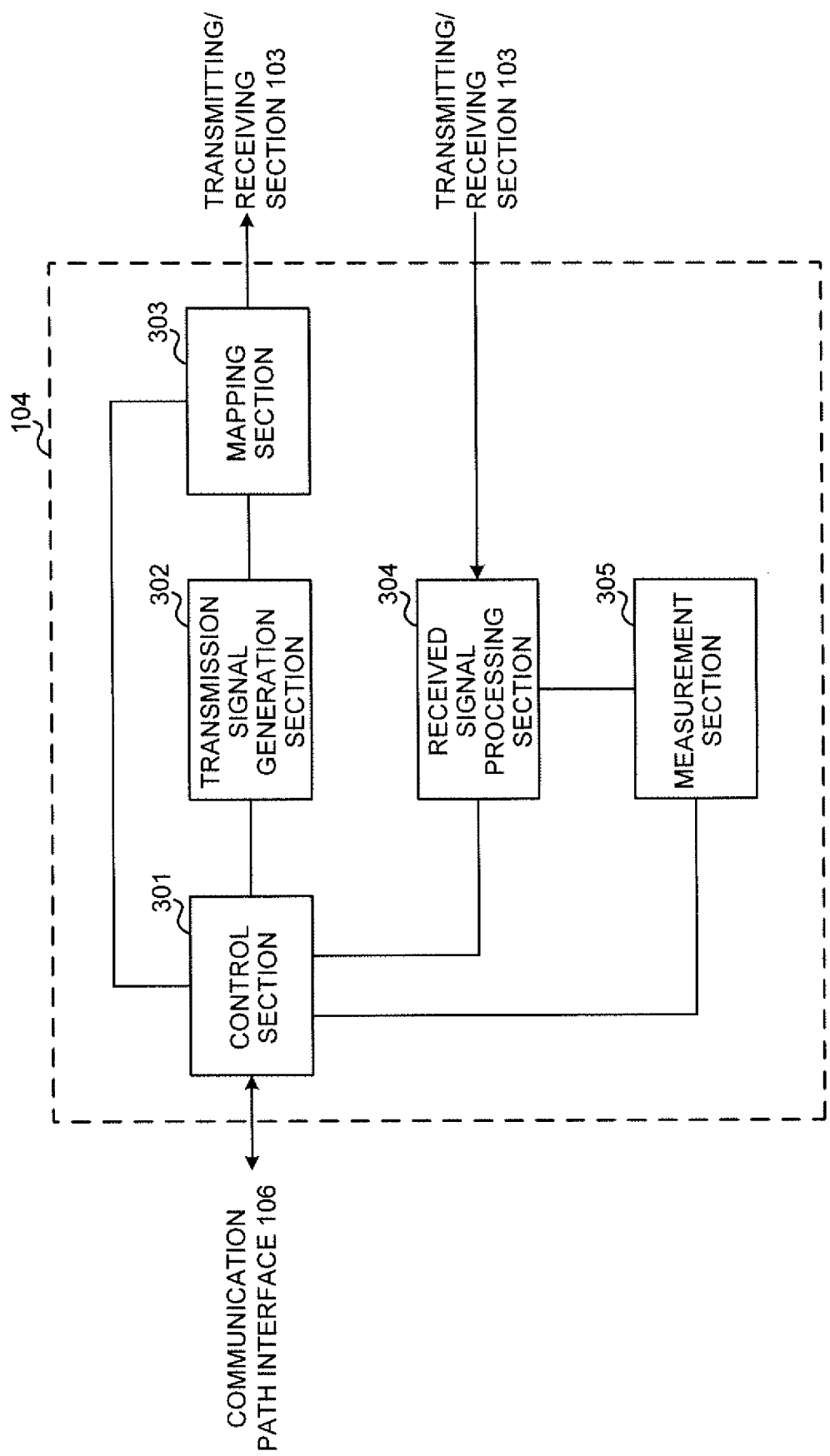
FIG. 6 is a diagram to show an exemplary functional structure of a radio base station according to an embodiment of the present invention.

FIG. 6 is a diagram to show an exemplary functional structure of a radio base station according to an embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

In addition, the control section 301 controls the scheduling of uplink data signals transmitted in the PUSCH, uplink control signals (for example, delivery acknowledgement information) transmitted in the PUCCH and/or the PUSCH, random access preambles transmitted in the PRACH, uplink reference signals, and so on.

The control section 301 may exert control so that transmitting beams and/or receiving beams are formed by using digital BF (for example, precoding) by the baseband signal processing section 104 and/or analog BF (for example, phase rotation) by the transmitting/receiving sections 103.

The control section 301 exerts control so that at least one of narrowband signals and wideband signals, which are for use for synchronization of user terminals 20 and/or measurements, are transmitted.

To transmit the wideband signals, the control section 301 may exert control so that signals that are transmitted in the frequency domain of the narrow band signals are generated based on first information (first identity (for example, cell ID)), and signals that are transmitted in frequency domains in the wideband signals other than the frequency domain of the narrowband signals are generated based on second information (second identity (for example, transmitting/receiving point ID, beam ID, etc.)).

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), uplink channel information (for example, CSI) and so on. The measurement results may be output to the control section 301.

(User Terminal)

Figure 7:
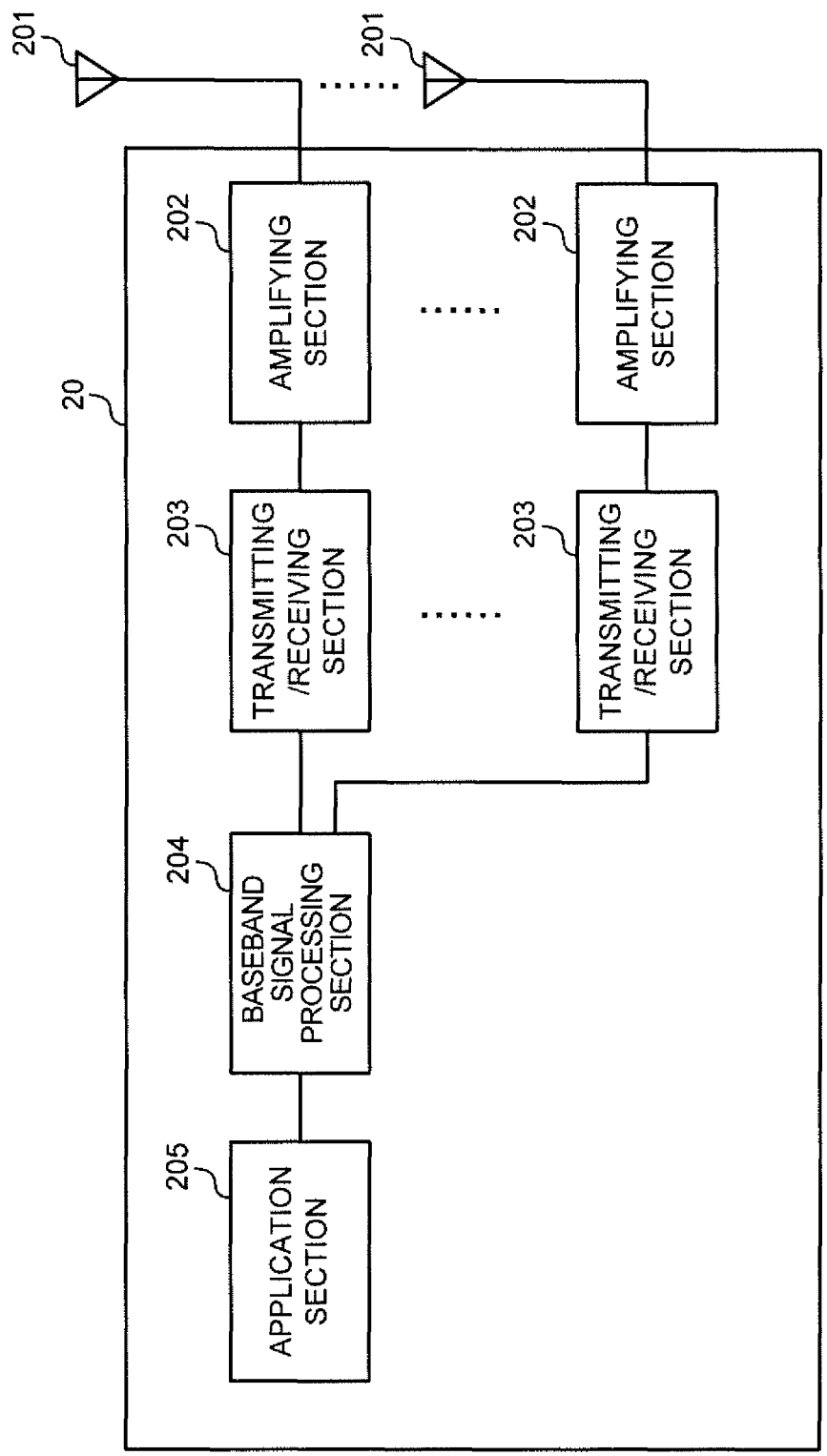
FIG. 7 is a diagram to show an exemplary overall structure of a user terminal according to an embodiment of the present invention.

FIG. 7 is a diagram to show an exemplary overall structure of a user terminal according to an embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 receive at least one of narrowband signals (narrowband SSs/RSs) and wideband signals (wideband SSs/RSs), which are designed to share the same transmission timing.

The transmitting/receiving sections 203 may receive the narrowband signals in a partial frequency domain that is included in the wideband signals' frequency domain, or the transmitting/receiving sections 203 may receive the wideband signals in the frequency domain where the narrowband signals' frequency domain is included. Also, the narrowband signals and/or the wideband signals may be formed with a plurality of signals that are time-division-multiplexed (TDM) and/or frequency-division-multiplexed (FDM).

The transmitting/receiving sections 203 may receive the wideband signals in a periodicity that matches an integer multiple of the transmission periodicity of the narrowband signals. The transmitting/receiving sections 203 may receive at least one of information as to whether wideband signals are present or not, information about the transmission bandwidth for wideband signals, and information about the timing for transmission of wideband signals.

Also, the transmitting/receiving sections 203 may transmit a request signal that requests wideband signals. In this case, the transmitting/receiving sections 203 may receive wideband signals in a predetermined period following the transmission of the request signal.

Figure 8:
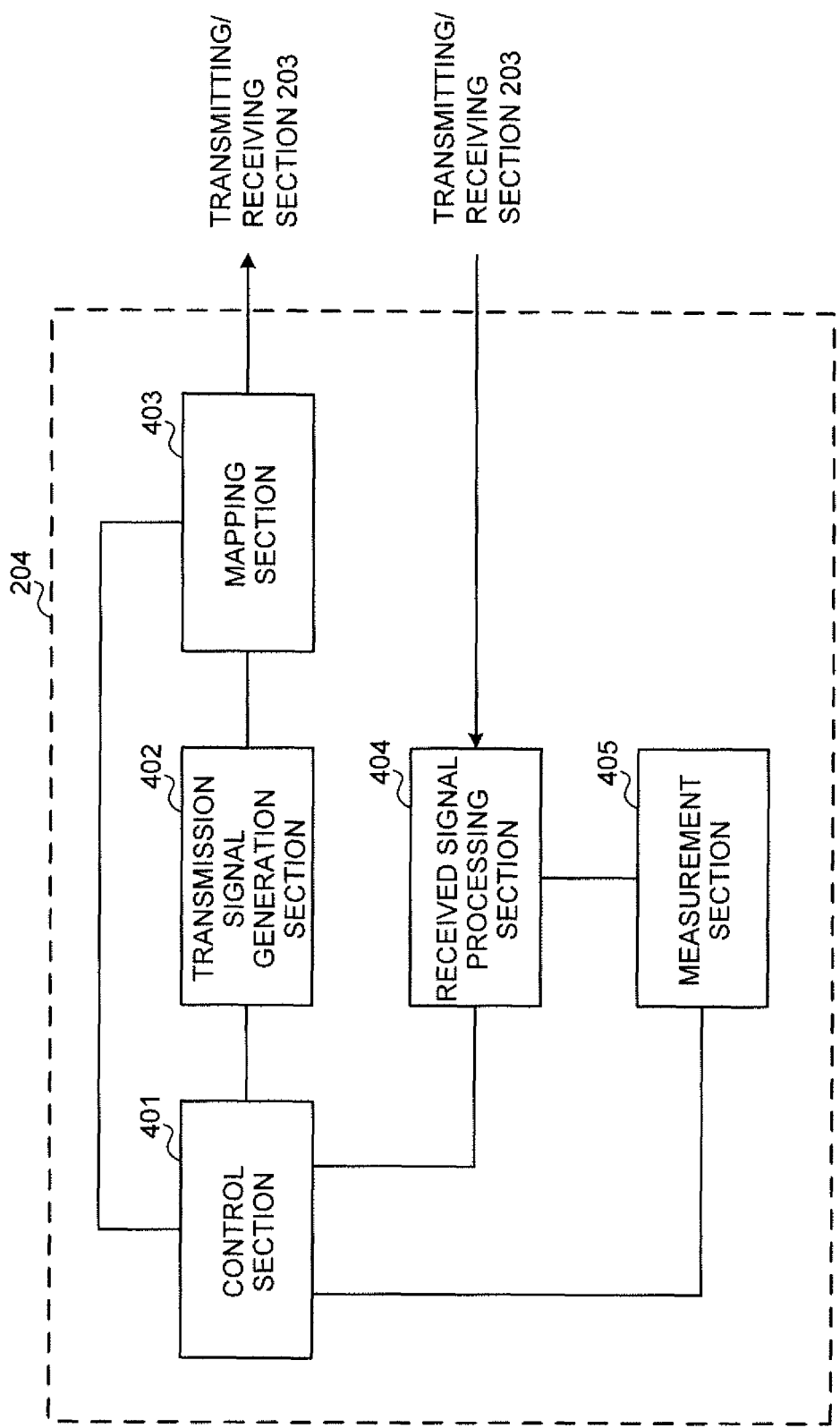
FIG. 8 is a diagram to show an exemplary functional structure of a user terminal according to an embodiment of the present invention.

FIG. 8 is a diagram to show an exemplary functional structure of a user terminal according to an embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on whether or not retransmission control is necessary, which is decided in response to downlink control signals and/or downlink data signals, and so on.

The control section 401 may exert control so that transmitting beams and/or receiving beams are formed by using digital BF (for example, precoding) by the baseband signal processing section 104 and/or analog BF (for example, phase rotation) by the transmitting/receiving sections 103.

The control section 401 exerts control so that at least one of narrowband signals and wideband signals, which are received in the transmitting/receiving sections 203, are used for synchronization and/or measurements.

When the transmitting/receiving sections 203 receives wideband signals, the control section 401 may exert control so that first information (first identity (for example, cell ID)) is acquired based on signals received in the frequency domain of the narrowband signals, and second information (second identity (for example, transmitting/receiving point ID, beam ID, etc.)) is acquired based on signals received in frequency domains in the wideband signals other than the frequency domain of the narrowband signals.

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded to information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. For example, the measurement section 405 performs measurements using downlink reference signals transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), down link channel information (for example, CSI) and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 9:
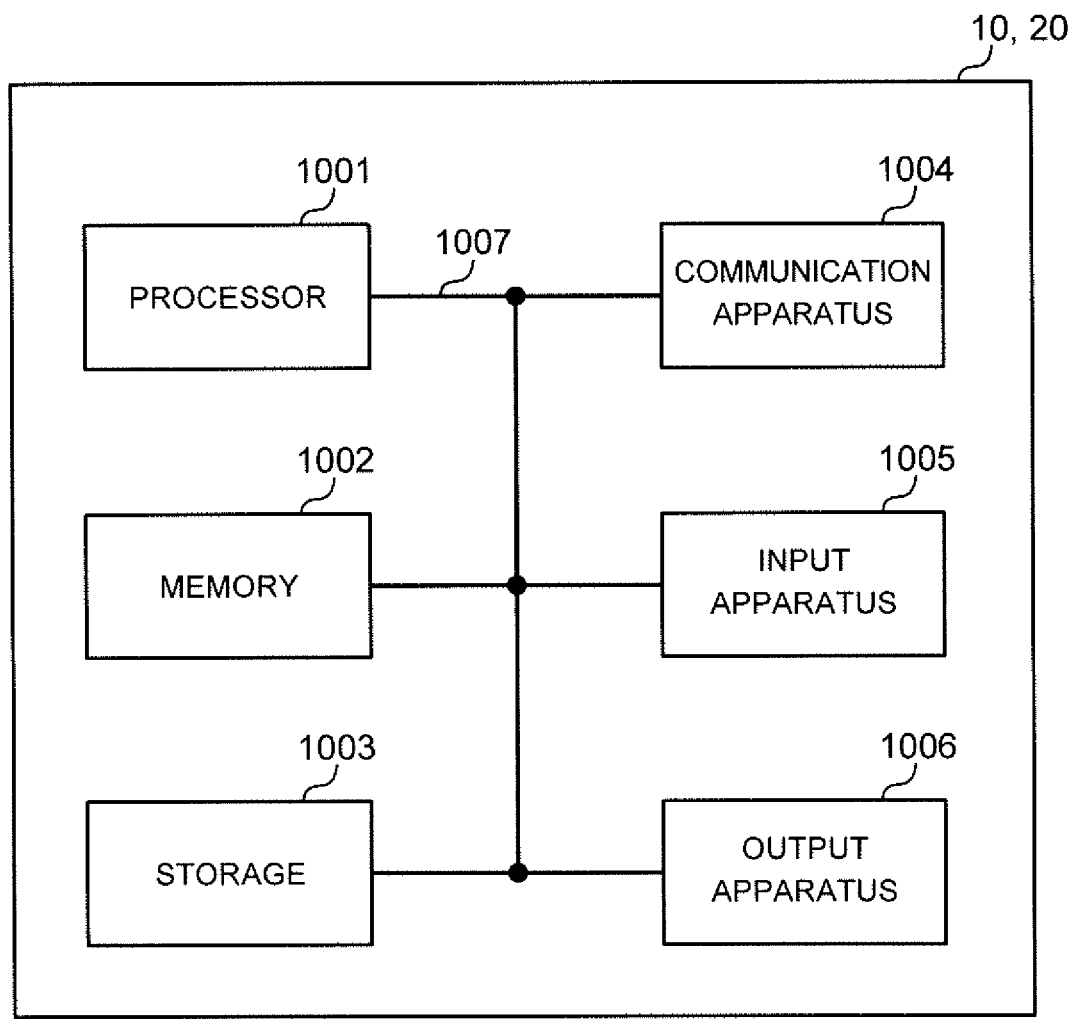
FIG. 9 is a diagram to show an exemplary hardware structure of a radio base station and a user terminal according to an embodiment of the present invention.

For example, the radio base station, user terminals and so on according to an embodiment of the present invention may function as a computer that executes the processes of the radio communication method of the present invention. FIG. 9 is a diagram to show an exemplary hardware structure of a radio base station and a user terminal according to an embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and/or a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. TTIs may be the time unit for transmitting channel-encoded data packets (transport blocks), or may be the unit of processing in scheduling, link adaptation and so on.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the above-described structures of radio frames, subframes, slots, symbols and so on are simply examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)," "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency domains, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-170057, filed on Aug. 31, 2016, including the specification, drawings and abstract, is incorporated herein by reference in its entirety.

The invention claimed is:

1. A terminal comprising:
    a receiving section that receives at least one of a narrowband signal and a wideband signal which are designed to share a same transmission timing; and
    a control section that exerts control to use at least one of the narrowband signal and the wideband signal for synchronization and/or measurement,
    wherein the receiving section receives the narrowband signal in a partial frequency domain that is included in a frequency domain of the wideband signal, and receives the wideband signal in the frequency domain that includes the frequency domain of the narrowband signal,
    wherein, when the wideband signal is received, the control section acquires cell ID based on a signal that is received in the frequency domain of the narrowband signal, and acquires transmitting and receiving point ID or beam ID based on a signal that is received in a frequency domain in the wideband signal other than the frequency domain of the narrowband signal.

2. The terminal according to claim 1, wherein the receiving section receives the wideband signal in a periodicity that matches an integral multiple of a transmission periodicity of the narrowband signal.

3. The terminal according to claim 2, wherein the narrowband signal and/or the wideband signal is formed with a plurality of signals that are time-division-multiplexed and/or frequency-division-multiplexed.

4. The terminal according to claim 2, wherein the receiving section receives at least one of information as to whether the wideband signal is present or not, information about a transmission bandwidth for the wideband signal, and information about the transmission timing for the wideband signal.

5. The terminal according to claim 2, further comprising a transmission section that transmits a request signal that requests the wideband signal, wherein the receiving section receives the wideband signal in a predetermined period following transmission of the request signal.

6. The terminal according to claim 1, wherein the narrowband signal and/or the wideband signal is formed with a plurality of signals that are time-division multiplexed and/or frequency-division-multiplexed.

7. The terminal according to claim 6, wherein the receiving section receives at least one of information as to whether the wideband signal is present or not, information about a transmission bandwidth for the wideband signal, and information about the transmission timing for the wideband signal.

8. The terminal according to claim 6, further comprising a transmission section that transmits a request signal that requests the wideband signal, wherein the receiving section receives the wideband signal in a predetermined period following transmission of the request signal.

9. The terminal according to claim 1, wherein the receiving section receives at least one of information as to whether the wideband signal is present or not information about a transmission bandwidth for the wideband signal, and information about the transmission timing for the wideband signal.

10. The terminal according to claim 1, further comprising a transmission section that transmits a request signal that requests the wideband signal, wherein the receiving section receives the wideband signal in a predetermined period following transmission of the request signal.

11. A radio communication method comprising:

receiving at least one of a narrowband signal and a wideband signal which are designed to share a same transmission timing; and exerting control to use at least one of the narrowband signal and the wideband signal for synchronization and/or measurement, wherein, in the receiving step, the narrowband signal is received in a partial frequency domain that is included in a frequency domain of the wideband signal, and the wideband signal is received in the frequency domain that includes the frequency domain of the narrowband signal, wherein, in the exerting step, when the wideband signal is received, cell ID is acquired based on a signal that is received in the frequency domain of the narrowband signal, and transmitting and receiving point ID or beam ID is acquired based on a signal that is received in a frequency domain in the wideband signal other than the frequency domain of the narrowband signal.

* * * * *